(12) United States Patent
Long

(10) Patent No.: US 12,327,916 B2
(45) Date of Patent: Jun. 10, 2025

(54) LOW PROFILE, HIGH POWER MICROWAVE ANTENNA, COMBINER AND RADIAL WAVEGUIDE AND ADDITIVE MANUFACTURE OF SAME

(71) Applicant: Southwest Research Institute, San Antonio, TX (US)

(72) Inventor: Stephen A. Long, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 254 days.

(21) Appl. No.: 18/305,555

(22) Filed: Apr. 24, 2023

(65) Prior Publication Data

US 2025/0007178 A1    Jan. 2, 2025

Related U.S. Application Data

(60) Provisional application No. 63/333,907, filed on Apr. 22, 2022.

(51) Int. Cl.
*H01Q 21/06* (2006.01)
*H01Q 1/38* (2006.01)
*B33Y 80/00* (2015.01)

(52) U.S. Cl.
CPC ............. *H01Q 21/062* (2013.01); *H01Q 1/38* (2013.01); *B33Y 80/00* (2014.12)

(58) Field of Classification Search
CPC ......... H01Q 21/062; H01Q 1/38; B33Y 80/00
See application file for complete search history.

(56) References Cited

U.S. PATENT DOCUMENTS

2024/0305015 A1* 9/2024 Formaggi .............. H01Q 15/24
2024/0313412 A1* 9/2024 Ranjbarnikkhah ..........................
H01Q 15/0086

* cited by examiner

*Primary Examiner* — David E Lotter
(74) *Attorney, Agent, or Firm* — Grossman, Tucker, Perreault & Pfleger, PLLC

(57) ABSTRACT

A low-profile, high-power microwave (HPM) antenna system that includes an antenna array formed of a plurality of low-profile dipole cells; an enclosure to surround the antenna array; and a radome cover disposed on top of the enclosure.

20 Claims, 8 Drawing Sheets

LOW PROFILE, HIGH POWER MICROWAVE ANTENNA, COMBINER AND RADIAL WAVEGUIDE AND ADDITIVE MANUFACTURE OF SAME

This application claims the benefit of U.S. Provisional Application Ser. No. 63/333,907, filed Apr. 22, 2022, which is hereby incorporated by reference in its entirety.

FIELD

The present disclosure relates to low-profile, high power microwave antenna structures, combiners, and radial waveguides, and also relates to additive manufacturing techniques for same.

BACKGROUND

There is a growing need to establish a stand-off capability that can quickly and cost effectively engage multiple hostile unmanned aircraft systems (UAS). To this end the Naval Surface Warfare Center Dahlgren Division (NSWCDD) is developing High Power Microwave (HPM) systems capable of reliably delivering extreme pulsed power to multiple and/or moving targets and neutralizing their onboard electronics. One key piece of the system is the radiating aperture, the antenna and radome. However, limited Commercial off the Shelf (COTS) HPM antenna designs currently exist. An ideal aperture would be low profile, potentially conformal, able to scale to a variety of aperture real estate constraints, and sufficiently rugged to meet shock and vibration profiles across a wide range of maritime environments. In the event that the hostile platforms feature shielding mechanisms that work against particular emitter bands or antenna orientations, an ideal aperture would support transmission of a wide range of frequencies and multiple polarizations.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
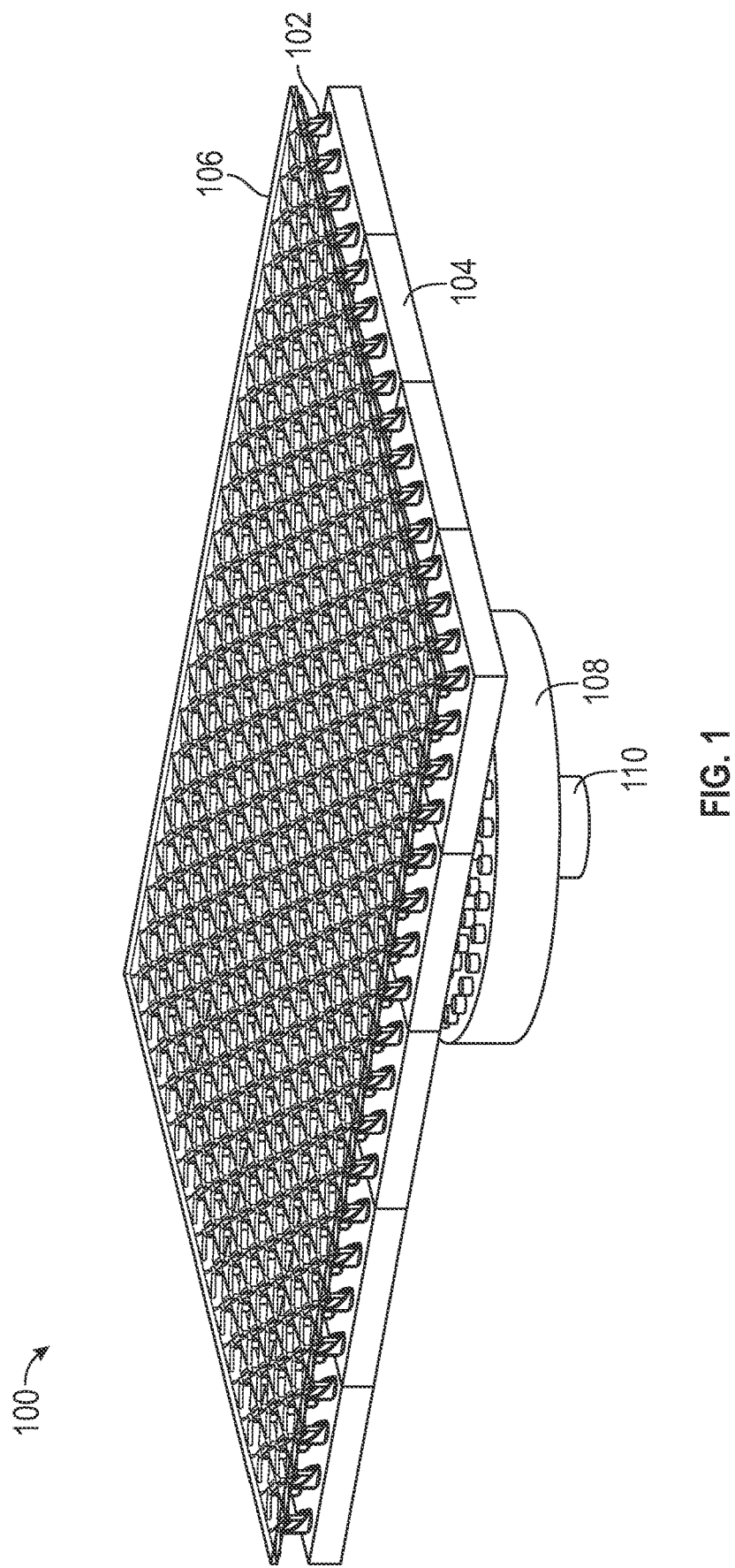
FIG. 1 illustrates a low-profile antenna system according to several embodiments of the present disclosure.

FIG. 1 illustrates a low-profile HPM antenna system 100 according to several embodiments of this disclosure. The antenna system 100 includes an all-metal HPM antenna array 102 housed within an enclosure 104. The array 102 includes a plurality of antenna elements (unit cells, described below) which in combination provide high power and high bandwidth operation. The array 102 (and each unit cell of the array 102) is formed on a base layer 104. The number of unit cells in the array 102 may be selected based on, for example, desired power and/or bandwidth capabilities. The system 100 also includes a radome cover 106 to fully enclose the array 102. Each unit cell of the antenna array 102 form a tightly coupled dipole array (TCDA). Ultrawideband operation is possible due to the coupling between electrically small unit cells. Individually, unit this small may fail to radiate, but when driven together they act as a "current sheet" and low VSWR is possible. The antenna array 102 is coupled to a radial waveguide 108 and a plurality of phase matched coax cables (illustrated in enclosure 110) to provide the RF signals to drive the antenna array 102. The antenna array 102 is configured to operate over a wide frequency range, for example, the range of 1-4 GHZ, and may also include frequencies across both L-band and S-band. Each antenna element in the array 102 is a crossed dipole configuration with a separate input for each polarization, thus providing a low profile arrays and providing polarization agility. With proper input phase control, the antenna 100 can radiate any linear or circular polarization desired. This is useful for defeating targets which may be hardened to particular polarizations.

The antenna array 102 uses capacitive coupling between elements to mitigate the inductive effect of being close to the ground plane. This allows for an exceptionally low profile: the element height is a fraction of a wavelength at the highest operating frequency. If designing for 1-4 GHz operation, the proposed antenna should be less than 2 inches tall above the base plate including the radome 106. Radomes for TCDAs are naturally integrated. Unlike traditional radome design where the goal is to be "invisible" with respect to the antenna, TCDAs are known to leverage the radome's interaction with the array to improve bandwidth, especially as the array scans. The radome 106 may be formed of, for example, a combination of fiberglass and Polytetrafluoroethylene (PTFE) with total thickness between ½ in to ¾ in should lie flush with the antenna to satisfy mechanical, thermal, and RF requirements. These materials have high dielectric strengths that can tolerate power densities measured in TW/m2 before dielectric breakdown occurs.

The antenna array 102 may be formed of all metal (e.g., copper, aluminum, platinum, amalgoms, etc.) using additive manufacturing such as 3-D printing, etc. In addition, the array 102 may be formed using selective laser melting of metal powders to additively produce array modules. The selective laser melting additive manufacture (SLM-AM) process enables antenna geometries that would be impossible for a traditional (i.e. subtraction) fabrication process like computer numerical control (CNC) machining.

Figure 2:
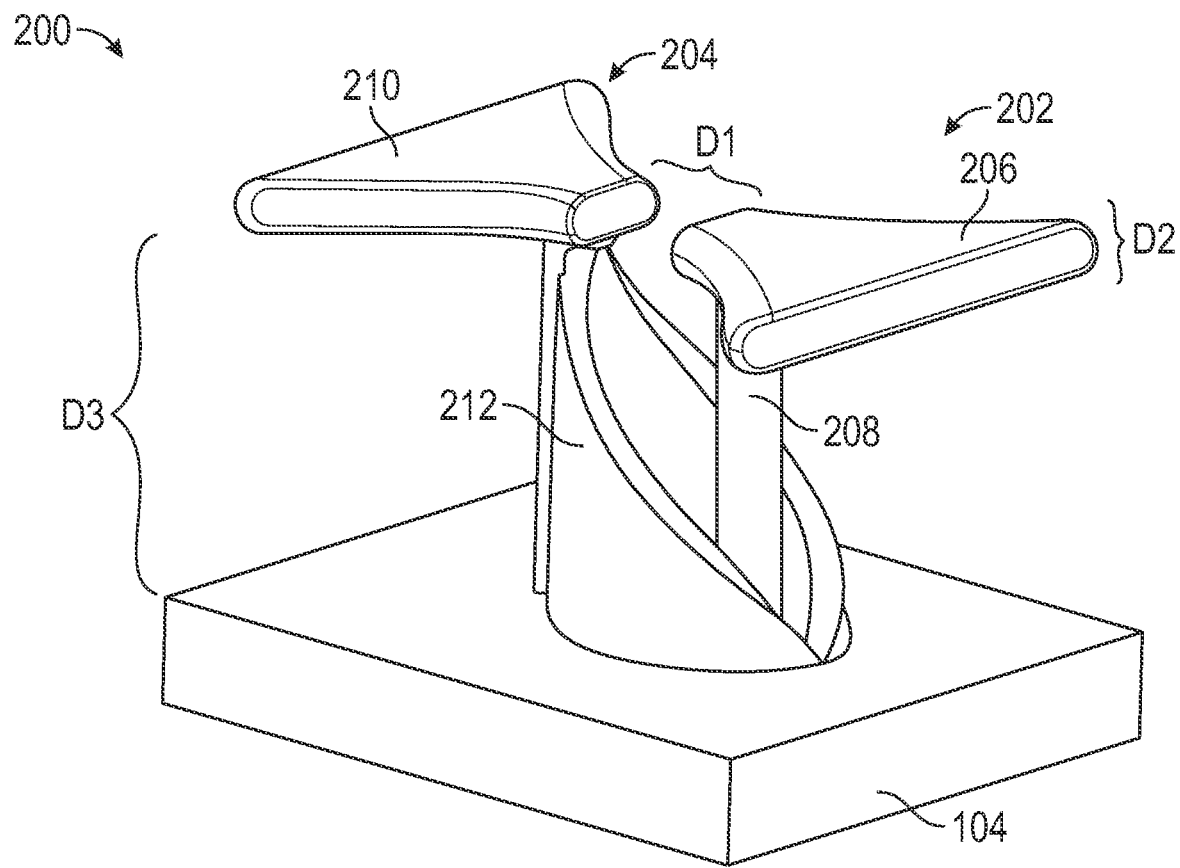
FIG. 2 illustrates a unit cell of the array of FIG. 1 according to one embodiment of the present disclosure.

FIG. 2 illustrates a unit cell 200 of the array 102 according to one embodiment of the present disclosure. The unit cell 200 of this embodiment includes dipole arms formed in a "bow tie" shape, as illustrated. The unit cell 200 includes dipole arms 202 and 204 extending above the base plate ground plane 104. Dipole arm 202 includes radiating element 206 disposed above the base plate 104 on stem 208. The radiating element 206 is a generally flattened horn-shaped structure as illustrated. The stem 208 may be formed as a generally circular rod-shaped structure, as illustrated. The stem 208 extends through the base plate 104 for connection to an RF energy source. The stem 208 is electrically isolated from the base plate 104. Dipole arm 204 includes radiating element 210 disposed above the base plate 104 on structure 212. The radiating element 210 is a generally flattened horn-shaped structure as illustrated. The structure 212 may generally be formed as an open pocket extending from the radiating element and coupled to the base plate 104. The "pocket" structure 212 is electrically isolated from stem 208, with stem 208 extending through the opening of the pocket structure 212, as illustrated. Pocket structure 212 is coupled to the base plate 104 for connection to an RF energy source. By way of example, a distance, D1, between each radiating element 206 and 210 may be in the range of 1-6 mm, a distance, D2, between a radiating element (e.g., element 206) and a radiating element of an adjacent unit cell (not shown in this Figure) may be in the range of 25-200 mm, and a distance, D3, between the radiating element 206 and 210 and the base plate 104 may be in the range of 9.5-38 mm. Of course, these are only example ranges, and the distances may be modified based on, for example, power requirements, size and weight considerations, etc.

Figure 3:
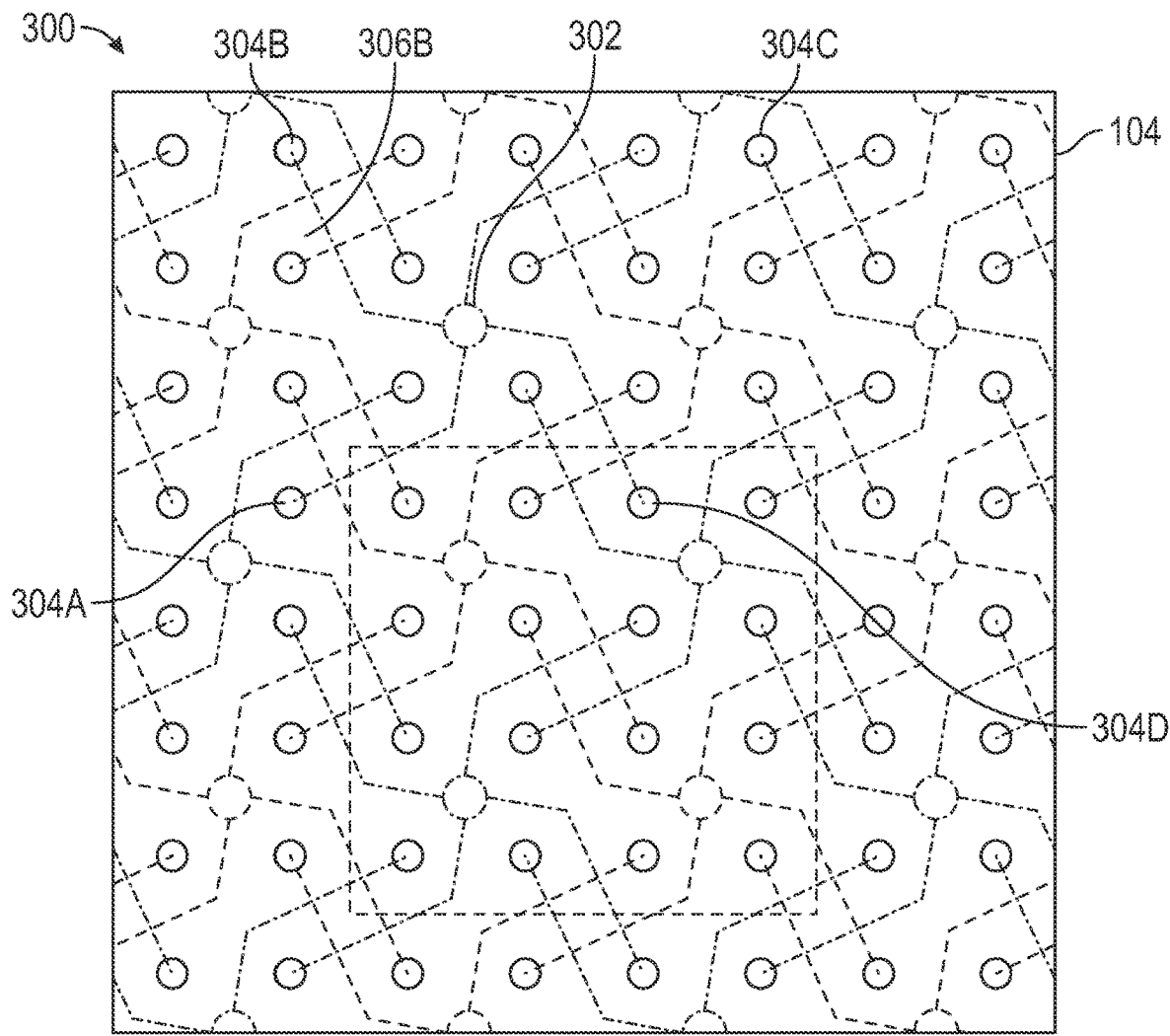
FIG. 3 illustrates an interwoven multilayer pinwheel network according to one embodiment of the present disclosure.

FIG. 3 illustrates an interwoven multilayer pinwheel network 300 according to one embodiment of the present disclosure. With continued reference to FIGS. 1 and 2, the pinwheel network 300 illustrates connection to each unit cell 200 of the array 102. In this embodiment, a coax feed point, e.g., 302, is RF coupled to four distant points 304A, 304B, 304C, 304D, where each point 304A, 304B, 304C, 304D represents an area of the array where a unit cell is formed. Each coax feed point, e.g., 302, is RF coupled to associated four distant points 304A, 304B, 304C, 304D via a pinwheel combiner, described below. Taking RF path 306B as an example, path 306B provides RF connection between coax feed point 302 and unit cell coupling point 304B. In this example embodiment, there are four arms, or paths, of the split that generally form a pinwheel shape, and each arm (path) bypasses the elements nearest the feeding point. Thus, feeding elements further away virtually quadruples the available real estate compared to feeding nearest elements. This allows for the ridged waveguides to be longer in order for smoother coax-ridge transitions for ultrawideband performance. To accommodate this enlarged real estate, the pinwheels are placed on two separate layers, with pinwheels on the same layer having interwoven arms.

Figure 4:
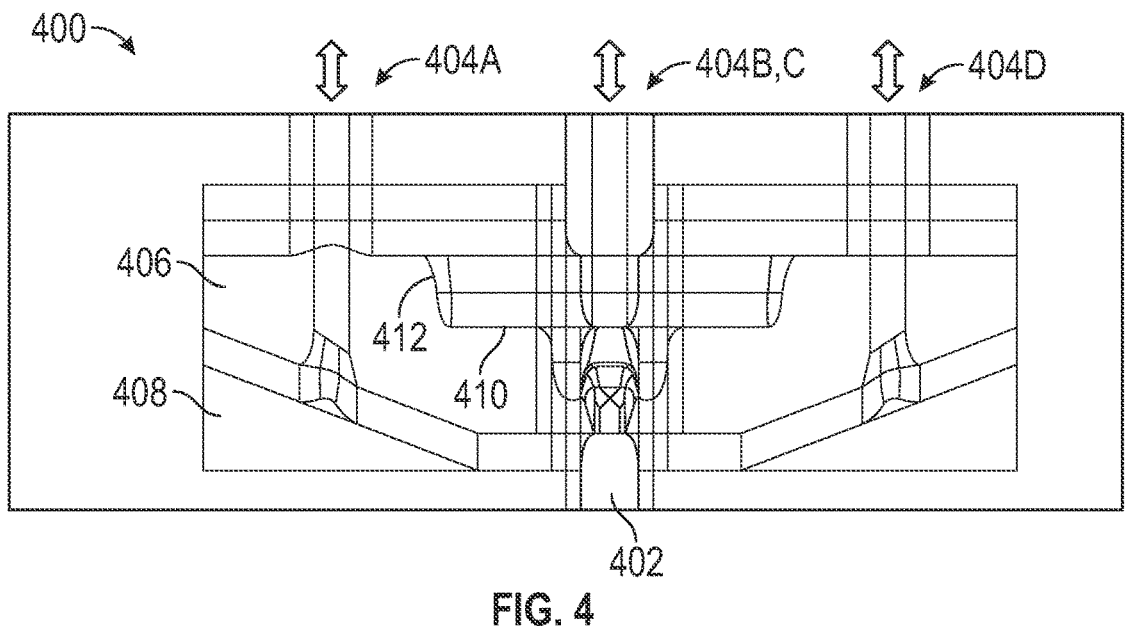
FIG. 4 illustrates a cross-sectional view of a 3D printed integrated multilayer pinwheel combiner according to one embodiment of the present disclosure.

FIG. 4 illustrates a cross-sectional view of a 3D printed integrated multilayer pinwheel combiner 400 according to one embodiment of the present disclosure. The pinwheel combiner 300 is formed using ridged rectangular waveguide. A conventional rectangular waveguide generally has a width requirement of half the wavelength at the lowest frequency of operation. Narrowband arrays might be able to accommodate this, but for ultrawideband arrays the spacing between elements are smaller fractions of this dimension. However, a ridged waveguide according to the teachings herein may be as narrow as one fifth of this wavelength, making waveguide routing much more achievable. Accordingly, the combiner 400 of FIG. 4 illustrates a cross-sectional view depicting a coax input 402 corresponding to coax feed point 302 of FIG. 3, and providing ridged waveguides to four unit cell coax points 404A, 404B, 404C, 404D corresponding the four unit cell points 304A, 304B, 304C, 304D of FIG. 3. Taking waveguide 406 as an example, each arm of the waveguide combiner includes a tapered floor section 408, starting a taper adjacent to feed point 402 and tapering so as to progressively narrow the waveguide 406 as it approaches unit cell coax point 404A. The waveguide combiner also includes a ceiling ridge portion 410 extending from the feed point 402 to at least extending beyond the lowest point of the tapered floor section 408. It will be appreciated the combiner 400 illustrated in FIG. 4 does not show the full length of the waveguide, where the full length of the waveguide corresponds a pinwheel arm section 306 of FIG. 3, and also includes the "bend" in each arm to form the pinwheel shape. The combiner 400 is formed of a continuous body of metal that can be additively manufactured.

Figure 5:
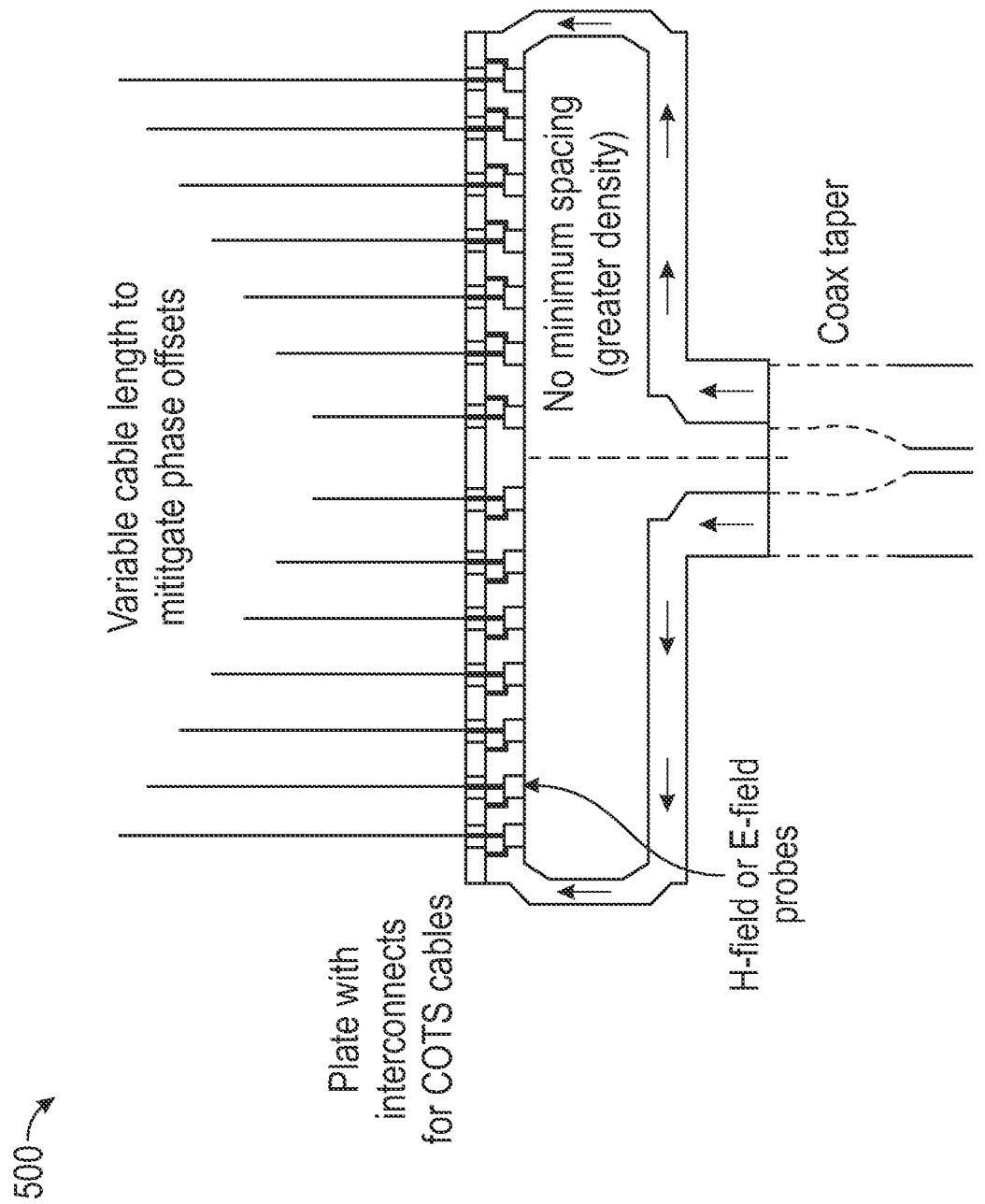
FIG. 5 illustrates a radial waveguide according to one embodiment of the present disclosure.

FIG. 5 illustrates a radial waveguide 500 according to one embodiment of the present disclosure. The radial waveguide 900 includes a plurality of concentric rings of probes operates on the principle of an inward traveling wave progressively being siphoned off with almost no energy reaching the center. In the conventional design, many typical design parameters are tied to helical antenna requirements. Most notably, the probes can be spaced no closer together than the antennas allow, and the helical antennas require adequate separation so as to avoid mutual coupling. The radial waveguide 500 according to the teachings herein allows for greater density, enabling more elements to be fed given a fixed diameter of the radial waveguide.

In the helical array use case, the probes couple energy into short lengths of coax formed out of holes in the top plate. The center conductor formed by the probe then extends through and coils to form the helix and a radome cover is placed on top. In the proposed design, the radome and helix are removed in lieu of a plate with holes and interconnects for COTS cables, etc.

An inward traveling wave may have timing offsets between rings (i.e. outer rings interact with the signal first), and these offsets need to be corrected for the array of antennas to coherently radiate. In the typical helical array use case, these timing offsets are corrected (over a narrow bandwidth) by rotation of the circularly polarized helical antennas. In the proposed design, these offsets are corrected by varying the lengths of the cables connected to the probes.

Because many HPM sources have circular waveguide (CWG) output ports, the radial waveguides designed for HPM thus far feature a transition from circular waveguide to coaxial waveguide. The proposed design could accommodate that as well but may also feature a tapered coax transition to accommodate HPM sources like nonlinear transmission lines (NLTLs).

Figure 6:
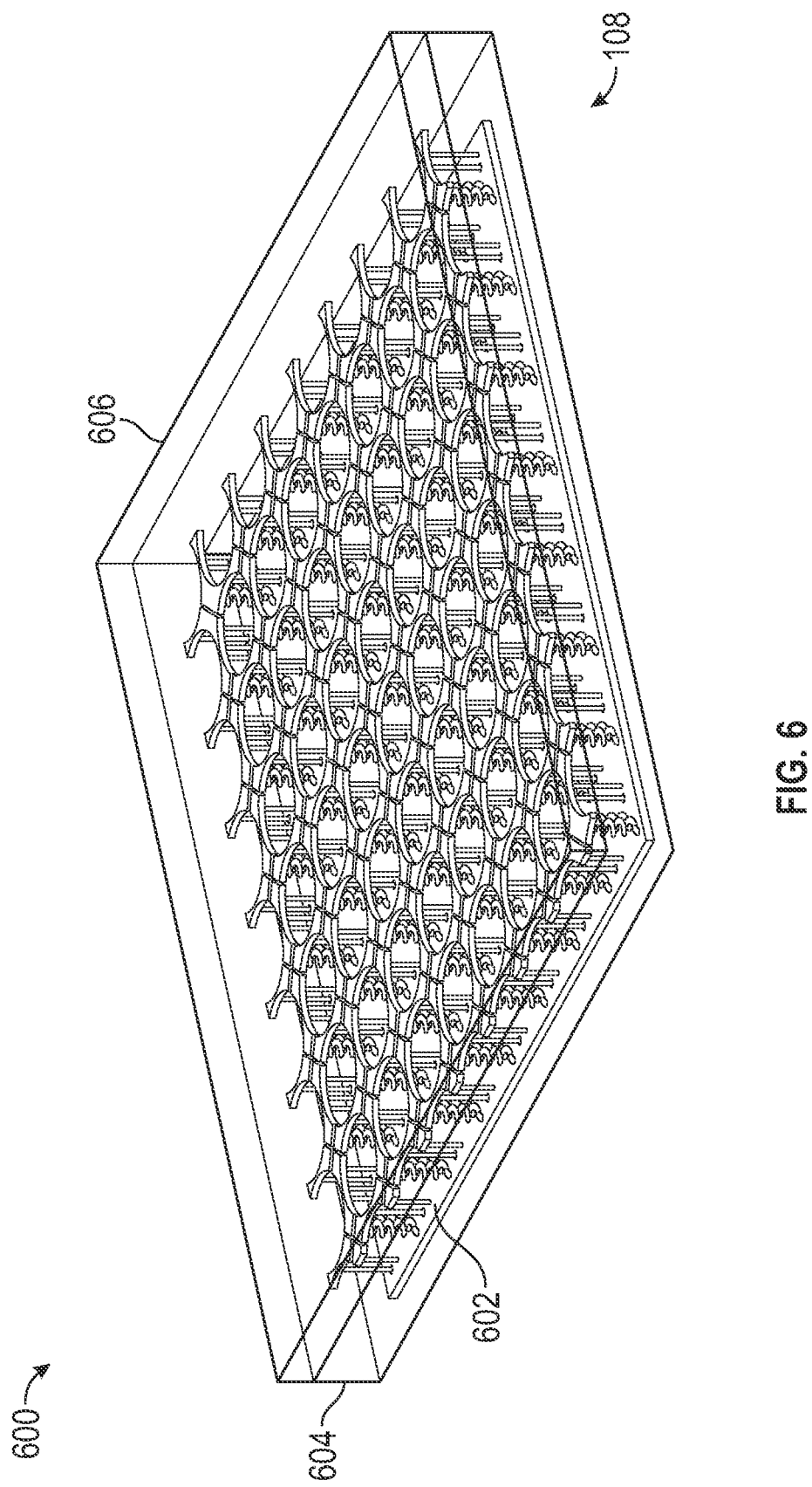
FIG. 6 illustrates another low-profile HPM antenna system according to several embodiments of this disclosure.

FIG. 6 illustrates another low-profile HPM antenna system 600 according to several embodiments of this disclosure. The antenna system 600 includes an all-metal HPM antenna array 602 housed within an enclosure 604. The system 600 also includes a radome cover 606 to fully enclose the array 602. The antenna array 602 is a type of tightly coupled dipole array (TCDA). Ultrawideband operation is possible due to the coupling between electrically small elements. Individually, elements this small would fail to radiate, but when driven together they act as a "current sheet" and low VSWR is possible. The antenna array 602 is coupled to a plurality of phase matched coax cables (not shown) to provide the RF signals to drive the antenna array 602. The antenna array 602 is configured to operate over a wide frequency range, for example, the range of 1-4 GHZ, and may also include frequencies across both L-band and S-band.

Figure 7:
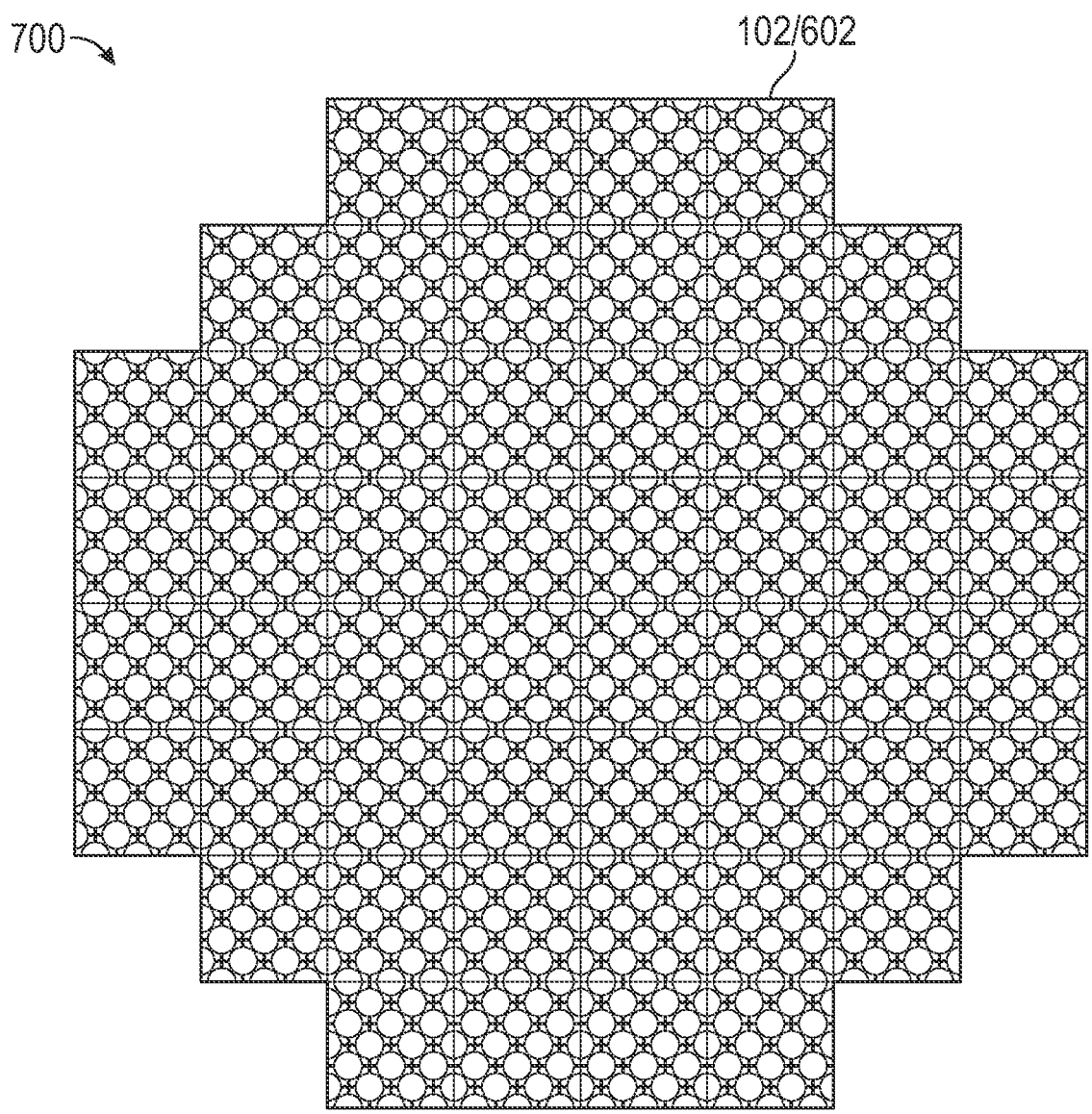
FIGS. 7 and 8 illustrate arbitrary shapes that may be constructed using the array of FIGS. 1 and 6.
Figure 8:
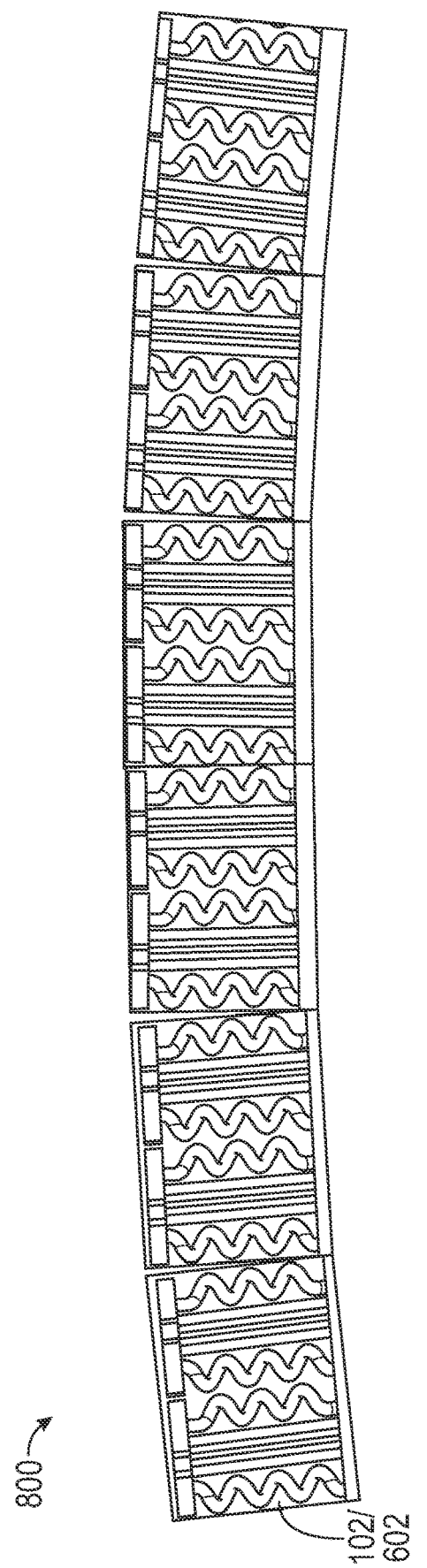

FIGS. 7 and 8 illustrate the arbitrary shapes that may be constructed using the array 102/602 and/or tiles of the array 102/602. In FIG. 7, a plurality of array tiles 102/602 are coupled together to form a variety of non-rectangular shapes, as shown. In FIG. 3, the array 102/602 may be formed having a curved shape, as shown. The antenna system 100/600 may have a weight corresponding to designated mission parameters, for example, 2.5 oz per unit cell, 4.5 oz per unit cell, etc.

Figure 9:
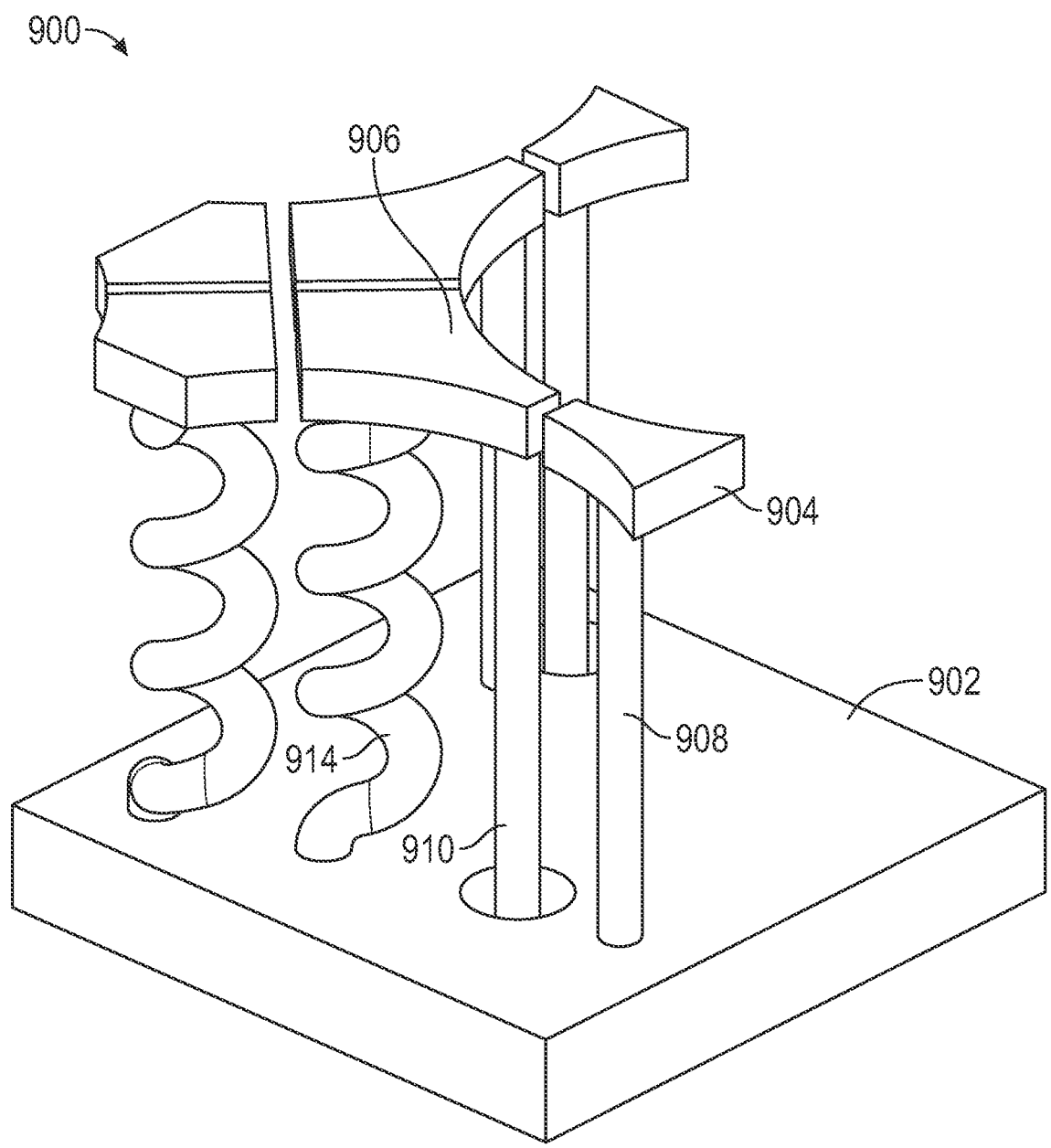
FIG. 9 illustrates a unit cell of the array 602 of FIG. 6 according to one embodiment of the present disclosure.

FIG. 9 illustrates a unit cell 900 of the array 602 of FIG. 6 according to one embodiment of the present disclosure. The unit cell 900 includes a baseplate 902 and dipole elements 904 and 906. The element size is approximately 1.58 in×1.58 in to enable operation up to 4 GHZ and scanning up to 60°. The elements are fed by coax connections from beneath the baseplate 902. Vertical posts 908, 910 form the electrical connections from the outer and inner conductors of the coax to opposing dipole arms. The unit cell also includes helical support post 914 between the signal dipole arm and the baseplate ground. The helical support post 914 links the dipole arm 906 to the baseplate 902, thus providing an additional channel for heat transfer to the base plate when the array is operating in a high power state. The helical post 414 also serves an RF purpose, mitigating an inherent drawback that comes with directly feeding the element by coax. Partially because of the feeding technique, the array is subject to "common mode resonance" which effectively determines the highest operating frequency of the antenna. The helical post 414 acts as a short and shifts this resonant frequency higher, thus extending the band of operation. Unfortunately, this short also introduces a "loop resonance" which effectively determines the lowest operating frequency of the device. However, by using a helical post 414 instead of a straight post, the path of the current's loop is effectively lengthened, making the electrical loop effectively larger. As a result, the number of turns of the helical post may be selected to lower the resonance frequency lower out of the band of operation.

An antenna for HPM needs exceptional power handling ability, and the "all-metal" nature of the proposed antenna supports both high peak power and high average power (i.e. running the pulsed system on a higher duty cycle for "burst mode"). Unlike most other ultrawideband TCDAs whose elements and feeds are only as thick as the 2 oz copper they are printed with, the ACSA can feature whatever conductor thickness is desired. This enables higher currents and greater heat transfer. To provide the maximum power handling capability, the radome/superstrate forms a seal at the perimeter of the array enclosure so that the cavity can be pressurized with SF6 gas. This gas has 2.5× the breakdown voltage of air, enabling 6.25× the peak power. For example, as long as conductors are separated by 0.029" the unit cell can handle 80 kW peak power before arcing occurs. The 50 MW peak power described in the SON could be distributed across an array of 625 active elements (e.g. 25×25 grids) which would provide a narrow, high gain, long range, electronically steered antenna beam. To allow scaling to a variety of aperture area constraints and non-uniform geometries, the proposed array elements support modular design which is standard practice for active electronically scanned arrays (AESAs). The SLM-AM fabrication process has a limited physical volume, but could feasibly produce 4×4 subarray modules based on a unit cell of FIG. 2. However, as seen in FIG. 2, orienting the cell or module edges to the dipoles results in dipole arms being split.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A low-profile, high power microwave (HPM) antenna system, comprising:
    an antenna array formed of a plurality of dipole unit cells, each unit cell comprising:
        a baseplate;
        a first radiating element disposed above the baseplate via a stem, the stem passing through the baseplate and being electrically isolated from the baseplate and connected to a first conductor of a coax connection; and
        a second radiating element disposed above the baseplate via an open pocket structure extending from the second radiating element and coupled to the base plate, the open pocket structure having an opening to receive the stem and being electrically isolated from the stem, the open pocket structure being electrically coupled to a second conductor of the coax connection;
    an enclosure to surround the antenna array; and
    a radome cover disposed on top of the enclosure.

2. The HPM antenna system of claim 1, wherein the radome cover is formed of a material selected from fiberglass and Polytetrafluoroethylene (PTFE).

3. The HPM antenna system of claim 1, wherein the antenna array being formed of metal using an additive manufacturing process.

4. The HPM antenna system of claim 3, wherein the additive manufacturing process is a 3D printing process.

5. The HPM antenna system of claim 3, wherein the metal is selected from copper, titanium, aluminum and/or amalgams thereof.

6. The HPM antenna system of claim 1, further comprising a combiner to direct radio frequency (RF) energy to a plurality of unit cells; the combiner comprising a waveguide.

7. The HPM antenna system of claim 6, wherein the combiner is a 4-way combiner waveguide to direct RF energy to four unit cells.

8. The HPM antenna system of claim 7, wherein the combiner formed as having a pinwheel shape to direct RF energy to non-adjacent unit cells.

9. The HPM antenna system of claim 8, wherein the combiner being formed of metal using an additive manufacturing process.

10. The HPM antenna system of claim 9, wherein the additive manufacturing process is a 3D printing process.

11. The HPM antenna system of claim 9, wherein the metal is selected from copper, titanium, aluminum and/or amalgams thereof.

12. The HPM antenna system of claim 1, further comprising a radial power splitter a plurality of waveguide concentric rings to direct radio frequency energy to a plurality of antenna arrays.

13. The HPM antenna system of claim 12, further comprising a plurality of cables coupled to the plurality of waveguide concentric rings; the cables having longer lengths associated with the outer concentric rings and shorter lengths associated with the inner concentric rings.

14. The HPM antenna system of claim 13, wherein the radial power splitter being formed of metal using an additive manufacturing process.

15. The HPM antenna system of claim 14, wherein the additive manufacturing process is a 3D printing process.

16. The HPM antenna system of claim 14, wherein the metal is selected from copper, titanium, aluminum and/or amalgams thereof.

17. A low-profile, high power microwave (HPM) antenna system, comprising:
   an antenna array formed of a plurality of dipole unit cells, each unit cell comprising:
      a baseplate;
      a first radiating element disposed above the baseplate via a stem, the stem passing through the baseplate and being electrically isolated from the baseplate and connected to a first conductor of a coax connection; and
      a second radiating element disposed above the baseplate via an open pocket structure extending from the second radiating element and coupled to the base plate, the open pocket structure having an opening to receive the stem and being electrically isolated from the stem, the open pocket structure being electrically coupled to a second conductor of the coax connection; and
   a combiner to direct radio frequency (RF) energy to a plurality of unit cells; the combiner comprising a waveguide, and wherein the combiner is a 4-way combiner waveguide to direct RF energy to four unit cells, and wherein the combiner formed as having a pinwheel shape to direct RF energy to non-adjacent unit cells.

18. The HPM antenna system of claim 17, wherein the antenna array and combiner being formed of metal using an additive manufacturing process, wherein the additive manufacturing process is a 3D printing process, and wherein the metal is selected from copper, titanium, aluminum and/or amalgams thereof.

19. A low-profile, high power microwave (HPM) antenna system, comprising:
   an antenna array formed of a plurality of dipole unit cells, each unit cell comprising:
      a baseplate;
      a first radiating element disposed above the baseplate via a stem, the stem passing through the baseplate and being electrically isolated from the baseplate and connected to a first conductor of a coax connection; and
      a second radiating element disposed above the baseplate via an open pocket structure extending from the second radiating element and coupled to the base plate, the open pocket structure having an opening to receive the stem and being electrically isolated from the stem, the open pocket structure being electrically coupled to a second conductor of the coax connection;
   a combiner to direct radio frequency (RF) energy to a plurality of unit cells; the combiner comprising a waveguide, and wherein the combiner is a 4-way combiner waveguide to direct RF energy to four unit cells, and wherein the combiner formed as having a pinwheel shape to direct RF energy to non-adjacent unit cells;
   an enclosure to surround the antenna array; and
   a radome cover disposed on top of the enclosure.

20. The HPM antenna system of claim 19, wherein the antenna array and combiner being formed of metal using an additive manufacturing process, wherein the additive manufacturing process is a 3D printing process, and wherein the metal is selected from copper, titanium, aluminum and/or amalgams thereof.

* * * * *